3,317,602
N-(p-CHLOROPHENOXYACETYL) EPHEDRINE

Kenneth Eric Vincent Spencer, Emsworth, England, assignor to American Home Products Corporation, New York, N.Y., a corporation of Delaware
No Drawing. Filed June 3, 1965, Ser. No. 461,184
Claims priority, application Great Britain, Sept. 18, 1964, 38,120/64
1 Claim. (Cl. 260—559)

This invention relates to certain pharmaceutically useful amides, to compositions containing the amides and to processes for preparing them.

The invention provides compounds of the formula:

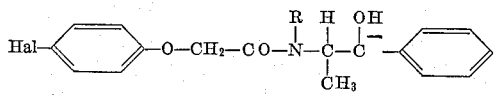

in which R is hydrogen or methyl and Hal is a halogen.

The invention also provides a process of preparing these compounds in which ephedrine or N-nor-ephedrine (N-methyl-$\beta$-hydroxy-$\beta$-phenylisopropylamine or $\beta$-hydroxy-$\beta$-phenylisopropylamine respectively) is p-halophenoxy-acetylated, for instance using the appropriate acid, e.g. in the presence of bis-cyclohexyl carbodiimide, acyl halide, anhydride, ester e.g. p-nitrophenyl ester, ketene, azide, or amide or by an exchange reaction between an amide of ephedrine or N-nor-ephedrine with the appropriate amide. Alternatively an N-(2-haloacetyl)-ephedrine or N-nor-ephedrine is condensed with a p-halophenol, e.g. in the presence of a base.

The process of the invention using a p-halophenoxy-acetyl halide is conveniently carried out in the presence of a base which is stronger than these amines, preferably in the presence of a tertiary amine e.g. pyridine or a trialkylamine, for instance in a non-aqueous solvent, but it can be carried out for instance in the presence of a strong base such as sodium hydroxide, sodium carbonate or sodium acetate in water in a two phase system with the p-halophenoxyacetyl halide and the ephedrine or N-nor-ephedrine in a water immiscible organic solvent, e.g. ether. However, it is preferred to carry out this reaction in a non-aqueous solvent in the substantial absence of water, alcohols or other materials which could enter into a side reaction with the p-halophenoxyacetyl halide.

The compounds of the invention have anti-depressant activity as indicated by antagonism of the hypothermia caused by reserpine in mice, and also anti-inflammatory activity as shown by reduction of oedema of the rat's paw induced by the injection of kaolin. They are preferably obtained in a substantially pure state and in particular preferably do not contain more than 2% by weight and preferably not more than 0.5% of ephedrine or N-nor-ephedrine starting material because of the powerful psychomotor stimulant action of these amines.

The invention also provides pharmaceutical compositions containing in association with a pharmaceutically acceptable carrier a p-halophenoxyacetyl ephedrine or N-nor-ephedrine. The compositions are preferably in unit dose form in which each dose unit contains from 10 to 500 mg. of the active amide.

The compositions of the invention conveniently contain the active amide in a unit dose of between 20 and 400 mg. and preferably in the range 50 to 250 mg.

A pharmaceutically acceptable carrier used in the composition of the invention can be solid or liquid. Solid compositions include powders, tablets, dispersible granules, capsules, cachets and suppositories. A solid carrier can be one or more substances which may also act as flavouring agents, binders or tablet disintegrating agents: it can also be an encapsulating material. In powders the carrier is a finely-divided solid which is in admixture with the finely-divided active amide. In tablets the active amide is mixed with carrier having the necessary binding properties in suitable proportions and compacted in the size and shape desired. The powders and tablets preferably contain 5 or 10 to 99% of the active amide. Suitable solid carriers are magnesium carbonate or stearate, talc, sugar, lactose, pectin, dextrin, starch, gelatin, tragacanth, methyl cellulose, sodium carboxymethyl cellulose, a low melting wax and cocoa butter. The term "composition" is intended to include the formulation of the active amide with encapsulating material as carrier to give a capsule in which the active amide (with or without carriers) is surrounded by carrier, which is thus in association with it. Similarly, cachets are included.

Liquid form compositions include solutions, suspensions or emulsions. The active amide may be dissolved or suspended in a pharmaceutically acceptable liquid carrier, such as sterile water preferably containing a non-ionic surface active agent such as the esters, e.g. fatty acid esters of polyhydroxy compounds, e.g. sorbitan, and particularly their polyethylene oxide derivatives, for instance Tween 80. It may be dissolved in an organic solvent or a mixture thereof and it may contain flavouring agents or other substances. Conveniently the composition is in a sterile form suitable for parenteral injection.

The active amide can be dispersed, e.g. dissolved in a suitable organic solvent, for instance aqueous propylene glycol or polyethylene glycol. In other instances compositions can be made by dispersing the finely-divided active amide in aqueous starch in sodium carboxymethyl cellulose solution; or in a suitable oil, for instance arachis oil. Liquid pharmaceutical compositions which are sterile solutions or suspensions can be utilized by intra-muscular, intraperitoneal, subcutaneous or intravenous injection.

The composition is sub-divided in unit doses containing appropriate quantities of the active amide: the unit dose form can be a packaged composition, the package containing discrete quantities of compositions, for example, packeted powders or vials or ampoules. The unit dosage form can be a capsule, cachet or tablet itself, or in can be the appropriate number of any of these in packaged form.

The invention also includes the amides in the absence of carrier where the compounds are in unit dosage form.

The invention further includes a process in which the active amide is mixed with a pharmaceutically acceptable carrier and divided into unit doses to give a composition in accordance with the invention.

EXAMPLE

Isobutyl chloroformate (3.9 ml., 30 mole) was added to a stirred and ice-cooled solution of p-chlorophenoxy-acetic acid (5.61 g., 30 mole) and dry triethylamine (4.2 ml., 30 mole) in dry tetrahydrofuran (100 ml.). The mixture was kept at 0° C. for 20 min. A freshly prepared solution of (−)-ephedrine hydrochloride (6.06 g., 30 mole) and dry triethylamine (4.2 ml., 30 mole) in ethyl acetate (50 ml.) was added and the mixture was kept 1 day at room temperature. The mixture was evaporated to a pasty residue, extracted with ethyl acetate to give a pale yellow oil which crystallized from ethyl-acetate/light petroleum (B.P. 60–80°) to give N-p-chlorophenoxyacetyl-(−) ephedrine (4.8 g.) as a colourless crystalline solid, M.P. 110–110.5°. On recrystallization from the same solvent the product had M.P. 110.5–111°, $[\alpha]_D^{23}$ 0° (c=1.1 in ethanol). (Found: C, 64.8; H, 6.0; N, 4.3; Cl, 10.6. $C_{18}H_{20}ClNO_3$ requires C, 64.8; H, 6.0; N, 4.2; Cl, 10.6%).

p-Chlorophenoxyacetyl ephedrine, M.P. 110.5–111° C. was tested for anti-depressant activity by administration intraperitoneally as a micronised suspension in 1% aqueous Tween 80 or as a suspension in 1% aqueous carboxymethyl cellulose solution to mice whose temperature had been lowered by administration of reserpine. The oral dose of the compound was 50 mg./kg. and the rise in temperature was 4.4° C.

This compound was also administered orally in a dose of 250 mg./kg. to rats and then paw oedema was induced in them by injection of kaolin. There was a substantial reduction in volume of the oedema formed compared with when there was no administration of the compound.

The intraperitoneal $LD_{50}$ of p-chlorophenoxyacetyl ephedrine was >400 mg./kg. in mice.

Capsules of the active amide are made up by filling into hard gelatin capsules of suitable size, 20 mg. per capsule of the active amide and 150 mg. per capsule of lactose powder which had been mixed and sifted to 40 mesh. Tablets can also be used containing e.g. 15 to 25 mg. each of the active amide.

Each capsule or other unit dose form for clinical use preferably contains from about 10 to 30 mg. of the active amide for use as an anti-depressant. For use as an anti-inflammatory agent it may be made up to contain from less than 15 to 500 mg. or between 20, 25, 30, 40 or 50 mg. and 500 mg. as desired, preferably between 100 and 400 mg.

The active amide is preferably derived from 1-ephedrine or 1-N-nor-ephedrine. The corresponding dl-starting materials can also conveniently be used.

What is claimed is:

N-(p-chlorophenoxyacetyl) ephedrine.

References Cited by the Examiner
FOREIGN PATENTS 1,840 6/1963 France.

OTHER REFERENCES

Shapiro et al., Jour. Amer. Chem. Soc., volume 80, pp. 6065–71 (1958).

Thuillier et al., Comptes Rendus Academie des Sciences, volume 258, pp. 3384–86 (March 1964).

WALTER A. MODANCE, *Primary Examiner.*

NATALIE TROUSOF, *Assistant Examiner.*